United States Patent
Lu et al.

(10) Patent No.: US 8,929,951 B2
(45) Date of Patent: Jan. 6, 2015

(54) ACTUATING DEVICE OF WIRELESS ACCESS POINT

(75) Inventors: Chia-Hao Lu, Zhubei (TW); Shi-Min Yen, Guishan Township, Taoyuan County (TW); Chih-Wei Liao, Hukou Township, Hsinchu County (TW)

(73) Assignee: Accton Technology Corporation, Hsinchu (TW)

( * ) Notice: Subject to any disclaimer, the term of this patent is extended or adjusted under 35 U.S.C. 154(b) by 386 days.

(21) Appl. No.: 13/546,112

(22) Filed: Jul. 11, 2012

(65) Prior Publication Data

US 2013/0015722 A1  Jan. 17, 2013

(51) Int. Cl.
*H04B 1/38* (2006.01)
*H04L 12/10* (2006.01)
*G06F 1/26* (2006.01)

(52) U.S. Cl.
CPC ............... *H04L 12/10* (2013.01); *G06F 1/266* (2013.01)
USPC ........................... 455/561; 455/41.2; 370/338

(58) Field of Classification Search
CPC ..... H04W 4/008; H04W 88/08; H04W 24/00; H04W 48/02; H04W 52/0203; H04W 84/12; H04W 76/02; H04W 48/20; H04W 24/04; H04W 40/24; H04W 40/246; H04W 52/0274; H04W 76/04; H04W 76/064; H04L 67/125; H04L 67/141; H04L 65/1069; H04L 27/2626; H04L 27/2647; H04B 17/00; H04B 1/44; H04R 1/1041; H05B 37/02; H04M 7/0066
USPC .............. 455/450, 509, 41.2, 561, 424, 3.01; 370/338, 328, 260
See application file for complete search history.

(56) References Cited

U.S. PATENT DOCUMENTS

| | | | |
|---|---|---|---|
| 7,792,076 B2 * | 9/2010 | Lee et al. | 370/329 |
| 8,787,832 B2 * | 7/2014 | Herron et al. | 455/41.2 |
| 2007/0253395 A1 * | 11/2007 | Graves et al. | 370/338 |
| 2009/0067371 A1 * | 3/2009 | Pesce et al. | 370/328 |
| 2011/0115603 A1 * | 5/2011 | Conlin et al. | 340/5.7 |

* cited by examiner

Primary Examiner — Sujatha Sharma
(74) Attorney, Agent, or Firm — Chun-Ming Shih

(57) ABSTRACT

An actuating device of a wireless access point (WAP), the WAP includes a first module, a second module with a power requirement, and an actuating device. The WAP has a first voltage range and a second voltage range. The actuating device includes a switching unit and a voltage regulating unit. The switching unit receives an input voltage and has two output terminals. The switching unit outputs a first voltage via the first output terminal when the input voltage is within the first voltage range, and outputs a second voltage via the second output terminal when the input voltage is within the second voltage range. The voltage regulating unit is coupled to the output terminals to convert the second voltage to the first voltage. The second module is coupled to the second output terminal of the switching unit.

19 Claims, 3 Drawing Sheets

ACTUATING DEVICE OF WIRELESS ACCESS POINT

BACKGROUND

1. Technical Field

The present invention relates to an actuating technology of wireless access point, particularly to an actuating device used of a wireless access point.

2. Related Art

By the development of the Power over Ethernet (PoE) technology, the access point device can obtain the electricity and information signal via the internet, such as internet telephone, wireless access point, web camera, hub, and computer, etc, and no extra power socket is needed, thereby reducing the cost of the power cord and being able to operate in the existed network without changing the framework of the network.

The existing wireless access points having the PoE function are configured to be powered by 48V voltage electricity source, and cannot work on both PoE function and the basic function wireless access function with 12V single voltage electricity source. In some circumstances, user only needs basic wireless access function rather than PoE function, and the existing wireless access points cannot fulfill the demand to provide a basic wireless access function by using 12V voltage adaptor.

BRIEF SUMMARY

In view of this, the present invention provides an actuating device of a wireless access point (WAP). The WAP comprises a first module, a second module with a power requirement larger than that of the first module, and an actuating device. The WAP has two acceptable voltage ranges including a first voltage range and a second voltage range. The actuating device includes a switching unit and a voltage regulating unit. The switching unit is for receiving an input voltage and has a first and a second output terminals. The switching unit outputs a first voltage via the first output terminal when the input voltage is within the first voltage range, and outputs a second voltage via the second output terminal when the input voltage is within the second voltage range. The voltage regulating unit is coupled to the first and second output terminals and converting the second voltage to the first voltage, and has an output terminal coupled to the first module. The second module is coupled to the second output terminal of the switching unit.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
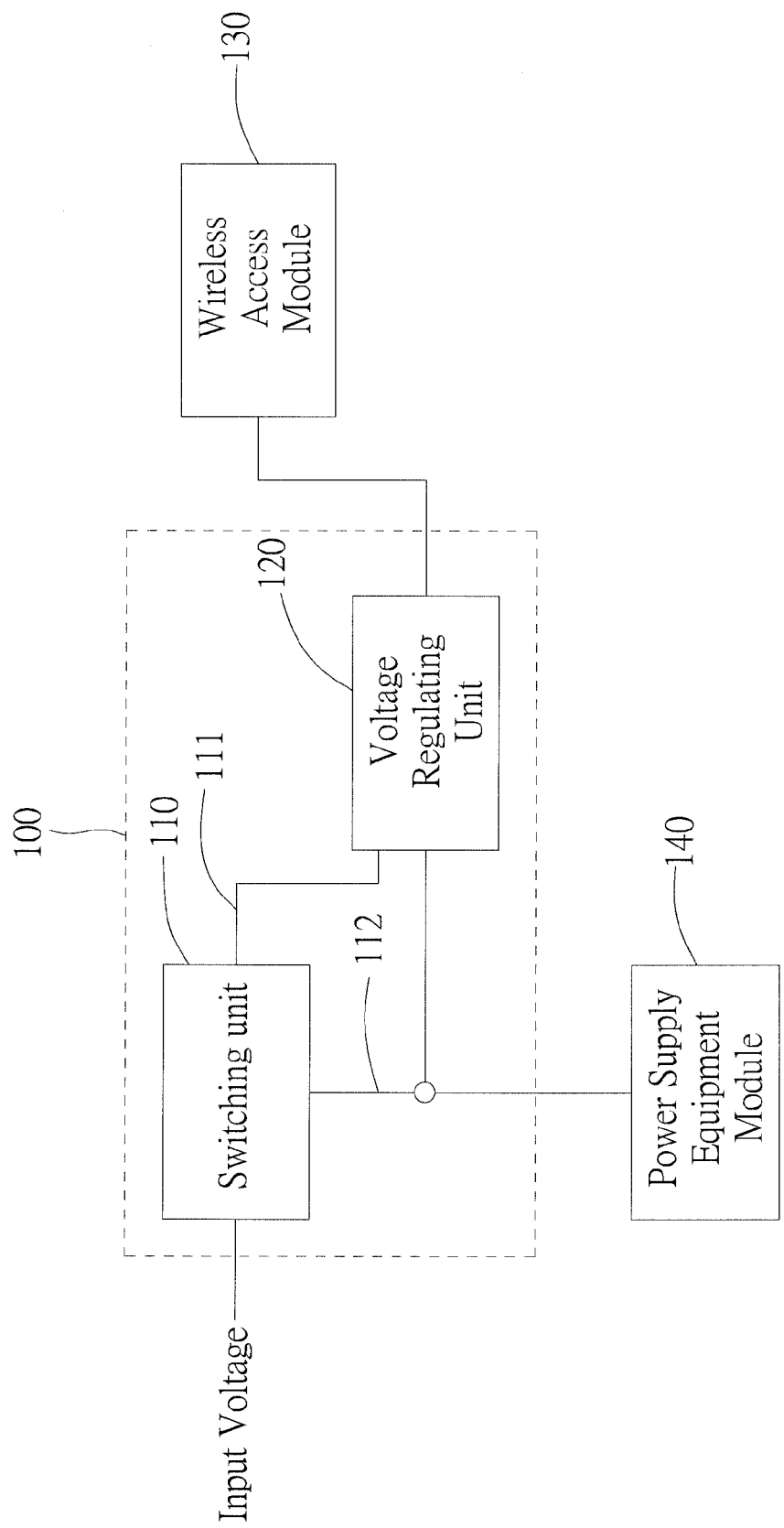
FIG. 1 is a schematic diagram of the wireless access point according to the first embodiment of the present invention.

Please refer to FIG. 1, which is a schematic diagram of the wireless access point (WAP) according to the first embodiment of the present invention. The WAP includes a first module and a second module, and an actuating device 100, and the power requirement of the second module is larger than the first module. The WAP has two acceptable voltage ranges includes a first voltage range and a second voltage range, and the second voltage range is larger than the first voltage range. The first module in the present embodiment is a wireless access module 130, which is used for accessing wireless signal, such as the module which executes wireless signal accessing according to the IEEE 802.11 wireless communication standard. The second module in the present embodiment is a power supply equipment module 140, which includes a power supply circuit for powering powered devices (PD), and a connecting interface for the powered devices, thereby enabling the WAP to have the PoE function.

The actuating device 100 includes a switching unit 110 having a first output terminal 111 and a second output terminal 112, and a voltage regulating unit 120. The switching unit 110 receiving an input voltage and having a first output terminal 111 and a second output terminal 112, in which the second output terminal 112 of the switching unit is coupled to the power supply equipment module 140. The voltage regulating unit 120 coupled to the first output terminal 111 and the second output terminal 112 and converting the second voltage to the first voltage, and has an output terminal coupled to the wireless access module 130. The switching unit 110 provides a first voltage to the voltage regulating unit 120 via the first output terminal 111 when the input voltage is within the first voltage range, and provides a second voltage to the power supply equipment module 140 via the second output terminal 112 when the input voltage is within the second voltage range. In the present embodiment, the first voltage range is the range of 5V to 12V direct current voltage, called 12V level; the second voltage range is the range of 37V to 57V direct current voltage, called 48V level, but not limited thereto. Besides, the first voltage in the present embodiment is a direct current voltage between 11V to 13V, and the second voltage is a direct current voltage between 47V to 49V, but not limited thereto.

In the embodiment of the present invention, the WAP has two working modes including a first working mode for accessing wireless signal, and a second working mode for both accessing wireless signal and providing the PoE function. When the WAP is powered by a power source, the switching unit 110 detects the input voltage and actuates the first working mode or the second working mode according to the input voltage. When the detected input voltage is between 37V and 57V, which is deemed as the input voltage in the second voltage range, the switching unit 110 actuates the second working mode. When the detected input voltage is between 5V to 12V, which is deemed as the input voltage in the first voltage range, the switching unit 110 actuates the first working mode. For example, when the input voltage is 48V direct current voltage, the switching unit 110 outputs 48V direct current voltage to the power supply equipment module 140 to enable the PoE function, and the voltage regulating unit 120 converts the 48V direct current voltage to 12V direct current voltage to the wireless access module 130 for accessing the wireless signal; when the input voltage is 12V direct current voltage, the switching unit 110 outputs 12V direct current voltage to the wireless access module 130 via the voltage regulating unit 120 to actuate the wireless access module 130 accessing wireless signal, and the PoE function is not enabled since no electricity is output to the power supply equipment module 140. Thus, when in the condition that the input voltage is not enough (not reach the second voltage range) or only 12V voltage adaptor is provided, the WAP is still able to work on accessing wireless signal but without PoE function.

The voltage regulating unit 120 couples the first output terminal 111 and the second output terminal 112 of the switching unit 110 in order to provide the direct current conforming to 12V level or 48V level to drive the low power on high power units or modules, and converts the second voltage (47V to 49V direct current voltage) to the first voltage (11V to 13V direct current voltage). Therefore, in the embodiment of the present invention, the wireless access module 130 is coupled to the output terminal of the voltage regulating unit 120, and thereby can work with the lower voltage. The power supply equipment module 140 is coupled to the second output terminal 112 of the switching unit 110, and thereby can work with the higher voltage.

Figure 2:
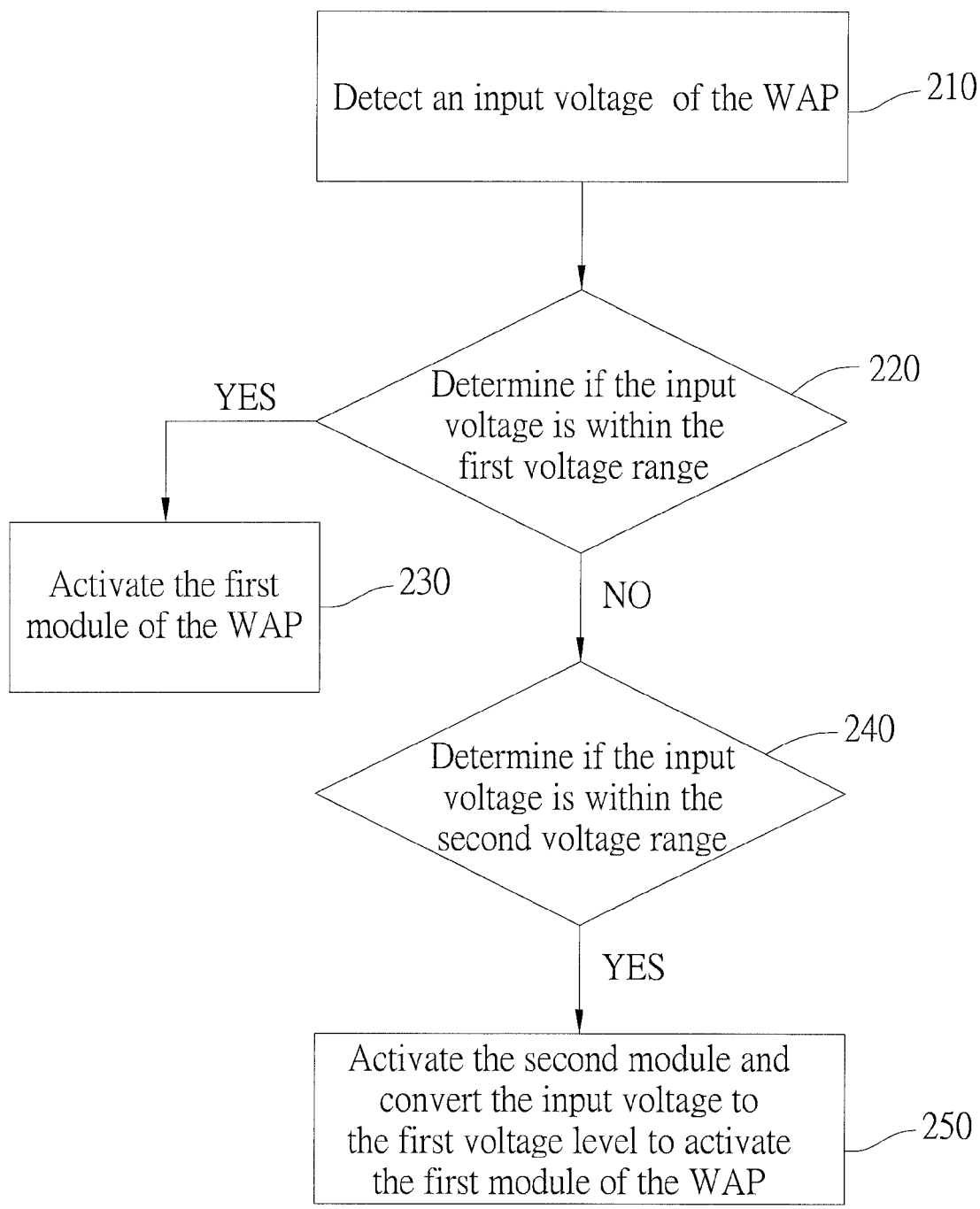
FIG. 2 is a flow chart of the wireless access point actuating method according to the first embodiment of the present invention.

Please refer to FIG. 2, which is a flow chart of the wireless access point operating method according to the embodiment of the present invention. The WAP operating method according to the present embodiment includes the steps as follows: In step 210, detect the input voltage of the WAP; In step 220, determine if the input voltage is within the first voltage range. If yes, in step 230, activate the first module of the WAP; if no, in step 240, determine if the input voltage is within the second voltage range. If the input voltage is within the second voltage range, in step 250, activate the second module and convert the input voltage to the first voltage to further activate the first module of the WAP.

Figure 3:
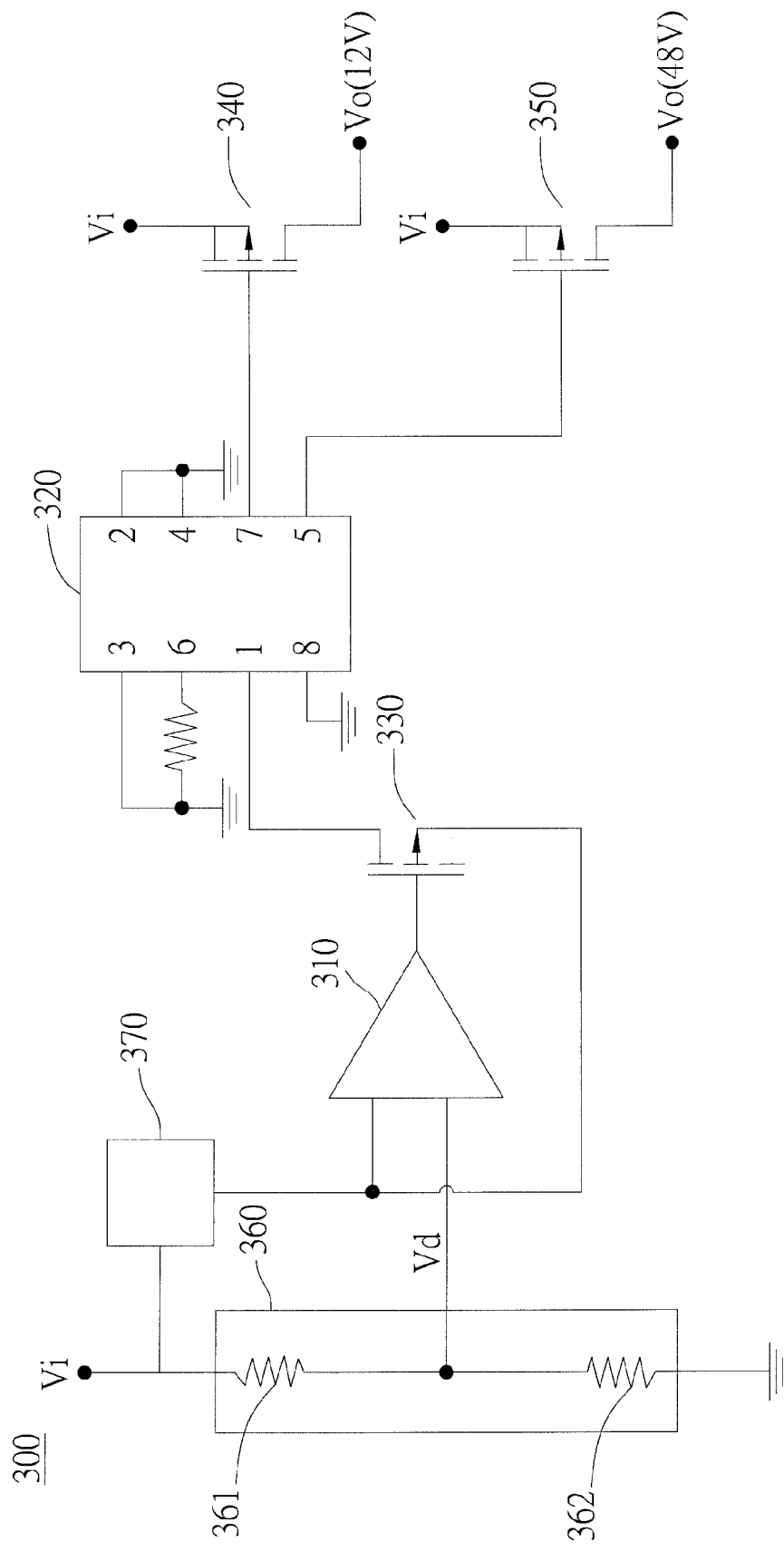
FIG. 3 is a schematic diagram of the selective circuit according to the first embodiment of the present invention.

Please refer to FIG. 3, which is a schematic diagram of the switching circuit of the switching unit 110. The switching circuit 300 includes a comparator 310, a relay 320, a voltage dividing circuit 360, a first transistor 340, a second transistor 350, a third transistor 330 and a direct current voltage regulator 370. The switching circuit 300 is powered by the input voltage Vi, and the direct current voltage regulator 370 regulates the input voltage into a reference voltage, and the reference voltage conducting to an input terminal of the comparator 310. In the embodiment of the present invention, the reference voltage is 5V, and the direct current voltage regulator 370 is a linear low dropout voltage regulator. When the input voltage Vi is within the second range (Voltage 37V to 57V), the voltage dividing circuit 360 takes out a divided voltage Vd from the input voltage Vi, and the Vd is about 9V-14V in present embodiment. When the input voltage Vi is within the first range (Voltage 5V to 12V), the voltage dividing circuit 360 takes out a divided voltage Vd from the input voltage Vi, and the Vd is about 1V-3V. The divided voltage Vd conducting to the other input terminal of the comparator 310. The voltage dividing circuit 360 is consisted of two series connected resistors 361 and 362.

First of all, When the input voltage Vi is within the first voltage range, the comparator 310 compares the divided voltage Vd with the reference voltage to generate a first switching voltage (Ex, 5V) or a second switching voltage (Ex, 0V). The output terminal of the comparator 310 is coupled to the gate of the transistor 330, and conducts the third transistor 330 to output a first signal (For example, a signal with a first current value or a signal with a first voltage value) to the relay 320 when the first switching voltage is generated. After the relay 320 received the first signal, a first controlling signal is sent to the first transistor 340 to conduct transistor 340, and the first voltage Vo (Voltage 11V to 13V) is obtained at the drain to actuate the wireless access function of the WAP. In the embodiment of the present invention, the first controlling signal is a high level voltage. Second, when the input voltage Vi is within the second voltage range, the comparator 310 compares the divided voltage Vd with the reference voltage to generate a second switching voltage (Ex, 0V). The output terminal of the comparator 310 is coupled to the gate of the transistor 330, and conducts the third transistor 330 to output a second signal. In the present embodiment, the third transistor 330 is not conducted since the second switching voltage is 0V, therefore the second signal is a 0 value current/voltage signal. After the relay 320 received the second signal, a second controlling signal is sent to the second transistor 350 to conduct the transistor 350, and the second voltage Vo(47V to 49V) is obtained at the drain of the transistor 350 to actuate the PoE function of the WAP. In the embodiment of the present invention, the second controlling signal is a high level voltage.

In sum, the switching voltage is used to conduct the first transistor 340 or second transistor 350, thereby making the switching unit to output the first or second voltage. Besides, the gates of the first transistor 340 is electrically connected to the relay 320 for outputting the first voltage, and the gate of the second transistor 350 is electrically connected to the relay 320 for outputting the second voltage. In the present embodiment, the transistors 330/340/350 are metal-oxide-semiconductor field effect transistors (MOSFET). The relay 320 in the present embodiment is produced by NEC (model: UB2-5V-TX2), but not limited thereto.

The invention being thus described, it will be obvious that the same may be varied in many ways. Such variations are not to be regarded as a departure from the spirit and scope of the invention, and all such modification as would be obvious to one skilled in the art are intended to be included within the scope of the following claims.

What is claimed is:

1. An actuating device of a wireless access point (WAP), the WAP comprising a first module and a second module with a power requirement larger than that of the first module; the WAP having two acceptable voltage range including a first voltage range and a second voltage range larger than the first voltage range; the actuating device comprising:
   a switching unit for receiving an input voltage and having first and second output terminals, wherein the switching unit outputs a first voltage via the first output terminal when the input voltage is within the first voltage range; the second switching unit outputs a second voltage via the output terminal when the input voltage is within the second voltage range;
   a voltage regulating unit coupled to the first and second output terminals and converting the second voltage to the first voltage;
   wherein the first module is coupled to an output terminal of the voltage regulating unit, and the second module is coupled to the second output terminal of the switching unit.

2. The actuating device according to claim 1, wherein the first voltage is direct current voltage in a range between 11V and 13V.

3. The actuating device according to claim 1, wherein the second voltage is direct current voltage in a range between 47V and 49V.

4. The actuating device according to claim 1, wherein the first voltage range is between direct current voltage 5V and 12V.

5. The actuating device according to claim 1, wherein the second voltage range is between direct current voltage 37V and 57V.

6. The actuating device according to claim 1, wherein the first module comprises a wireless access module to enable the wireless access function of the WAP.

7. The actuating device according to claim 1, wherein the second module comprises a power supply device to enable a Power over Ethernet (PoE) function of the WAP.

8. The actuating device according to claim 1, wherein the switching unit further comprises:
a relay for outputting a first controlling signal according to a first signal or a second controlling signal according to a second signal;
a first transistor for outputting the first voltage according to the first controlling signal; and
a second transistor for outputting the second voltage according to the second controlling signal.

9. The actuating device according to claim 8, wherein the switching unit further comprises:
a voltage dividing circuit for outputting a dividing voltage according to the input voltage;
a direct current voltage regulator for providing a reference voltage;
a comparator coupled to the voltage dividing circuit and the direct current voltage regulator to output a switching voltage according to the dividing voltage and the reference voltage; and
a third transistor for outputting the first signal or the second signal corresponding to the strength of the switching voltage.

10. An actuating of a wireless access point (WAP), the WAP comprising a first module and a second module with a power requirement larger than that of the first module, the actuating device comprising:
a switching unit including:
a direct current voltage regulator receiving an input voltage of the WAP and regulating the input voltage into a reference voltage;
a voltage dividing circuit outputting a dividing voltage according to the input voltage;
a comparator coupling to the voltage dividing circuit and the direct current voltage regulator to output a switching voltage according to the dividing voltage and the reference voltage;
a third transistor coupling to the comparator to output the first signal or the second signal according to the switching voltage;
a relay coupling to the third transistor to output a first controlling signal or a second controlling signal according to the first signal or the second signal respectively;
a first transistor coupling to the relay to control the output of the first voltage according to the first controlling signal; and
a second transistor coupling to the relay to control the output of the second voltage according to the second controlling signal;
a voltage regulating unit coupled to the first and second transistors and converting the second voltage to the first voltage, and then outputting the first voltage through a terminal;
wherein the first module is coupled to an output terminal of the voltage regulating unit, and the second module is coupled to the second output terminal of the switching unit.

11. The actuating device according to claim 10, wherein a range of the first voltage is between 11V and 13V.

12. The actuating device according to claim 10, wherein a range of the second voltage is between 47V and 49V.

13. The actuating device according to claim 10, wherein the relay outputs the first controlling signal to control the first transistor to output the first voltage while the input voltage is a 12V level direct current voltage between 5V and 12V.

14. The actuating device according to claim 10, wherein the relay outputs the second controlling signal to control the second transistor to output the second voltage while the second voltage range is a 48V level direct current voltage between 37V and 57V.

15. The actuating device according to claim 10, wherein the reference voltage is 5V.

16. The actuating device according to claim 10, wherein the switching voltage of the comparator includes a first switching voltage and a second switching voltage; the third transistor outputs the first signal while the third transistor receives the first switching voltage; and the third transistor outputs the second signal while the third transistor receives the second switching voltage.

17. The actuating device according to claim 16, wherein the first switching voltage is greater than the second switching voltage.

18. The actuating device according to claim 17, wherein the first switching voltage is 5V, and the second switching voltage is 0V.

19. The actuating device according to claim 10, wherein the first controlling signal is a high voltage range voltage, and the second controlling signal is a high voltage range voltage.

* * * * *